United States Patent [19]
Pinson

[11] Patent Number: 5,156,453
[45] Date of Patent: Oct. 20, 1992

[54] EMBELLISHER FOR AT LEAST PARTLY SURROUNDING A GLASS, MORE PARTICULARLY A DRIVING LAMP GLASS FOR AN AUTOMOTIVE VEHICLE

[75] Inventor: Ghislaine Pinson, Villeneuve la Garenne, France

[73] Assignee: Valeo VIsion, Bobigny Cedex, France

[21] Appl. No.: 659,261

[22] Filed: Feb. 22, 1991

[51] Int. Cl.$^5$ ............................................. F21V 21/00
[52] U.S. Cl. ........................................ 362/61; 362/80; 362/457
[58] Field of Search ................ 362/61, 268, 327, 331, 362/80, 83, 457, 458, 806; 296/194; 280/762, 770

[56] References Cited

U.S. PATENT DOCUMENTS

| | | | |
|---|---|---|---|
| 4,241,388 | 12/1980 | Green | 362/268 |
| 4,542,448 | 9/1985 | Yamai et al. | 362/351 |
| 4,654,761 | 3/1987 | Walsh | 362/351 |
| 4,722,023 | 1/1988 | Arima et al. | 362/61 |
| 4,835,666 | 5/1989 | Feger | 362/268 |
| 4,972,302 | 11/1990 | Masuyama et al. | 362/268 |

FOREIGN PATENT DOCUMENTS

| | | | |
|---|---|---|---|
| 626233 | 2/1936 | Fed. Rep. of Germany | 362/331 |
| 2499211 | 8/1982 | France . | |
| 2501334 | 9/1982 | France . | |
| 537896 | 7/1941 | United Kingdom | 362/331 |

*Primary Examiner*—Richard R. Cole
*Attorney, Agent, or Firm*—Dennison, Meserole, Pollack & Scheiner

[57] ABSTRACT

An embellisher is arranged to surround, at least partially a glass which is generally of the kind typified by a cover glass of an auxiliary driving lamp, such as a long range lamp or fog lamp for an automotive vehicle. The embellisher has a structure comprising at least two layers, one of which is an outer layer which is transparent, with reliefs in the form of ribs or the like being formed at the interface between two of the layers.

6 Claims, 3 Drawing Sheets

EMBELLISHER FOR AT LEAST PARTLY SURROUNDING A GLASS, MORE PARTICULARLY A DRIVING LAMP GLASS FOR AN AUTOMOTIVE VEHICLE

FIELD OF THE INVENTION

This invention relates to an embellisher for surrounding, at least partially, a glass or plastic lens of a lamp which in the context of this specification means a material of the general type which is typified by the cover or lens of a driving lamp for a vehicle. Such a lamp may, without limitation, be an auxiliary lamp such as a long range driving lamp or fog lamp for an automotive vehicle.

BACKGROUND OF THE INVENTION

Such an embellisher is generally employed to adapt a lamp of any particular size for mounting in a housing which is provided in part of the bodywork of an automotive vehicle, since the dimensions of the housing may vary according to what vehicle is to be equipped with the lamp.

In most cases, the embellisher is in the form of a tubular hollow body having a flange portion and a base where the base has an aperture or window; the shape and dimensions of the window correspond to the shape and dimensions of the front face of a lamp around which the embellisher is to be fitted. The lamp and the embellisher are secured to the vehicle housing by any appropriate means, preferably in such a way that the front face of the lamp, which will normally be defined by the lens, lies flush in the window of the embellisher.

The lamp glass conventionally has ribs, at least some of which have the function of ensuring correct distribution of the light beam emitted by the lamp. For aesthetic reasons, it is common to provide reliefs on the base of the embellisher. These reliefs provide a visual effect which continues that of the ribs on the lens. The reliefs are usually aluminised so as to confer on the lamp the appearance of a reflector seen through the lens.

In order to protect the reliefs from becoming clogged with dirt, the reliefs are formed on an internal or inner face of the base of the embellisher, lying inside the space defined by the cylindrical hollow body of the embellisher so that the inner face is thus enclosed. Such an embellisher is made of transparent plastics material, with an aluminium layer deposited by vacuum metalisation on the inner face.

The above arrangements, which enable a satisfactory aesthetic effect to be obtained, do involve difficulties in manufacture which can lead to unacceptable wastage, unless complex and tiresome techniques are adopted in the metalising process. In particular, it is especially difficult to repeatedly provide correct and uniform coatings by vacumetalisation on reliefs which lie within a tubular enclosure, or in other words within the interior of a concave member.

DISCUSSION OF THE INVENTION

An object of the present invention is to provide an embellisher for at least partially surrounding the lens of a, in which the structure and design of the embellisher are such that its manufacture is made easier and avoids the drawbacks mentioned above.

In accordance with the invention, the embellisher is characterised firstly by a structure having at least two layers, one of which, namely an outer layer, is transparent, and secondly in that reliefs in the form of ribs are formed at the interface between the two said layers.

In a first group of embodiments of the invention, a said layer, namely an inner layer is formed in self-coloured material and has on one face thereof, namely a contoured face, reliefs which are typically in the form of ribs, while the said transparent outer layer is moulded on to the said contoured face.

Preferably, the embellisher in this first type of embodiment is made by moulding using an injection moulding machine of the two-colour or two-material kind.

In these ways, the problems discussed above in connection with embellishers of known types are avoided. In a second group of embodiments of the invention, one said layer, namely the inner layer, has on one face thereof, namely a contoured face, reliefs which are typically in the form of ribs, on to which there is applied a coating which is shiny or in a metal such as aluminium, the said transparent outer layer being moulded on to the said contoured face thus coated.

Preferably, the said coating is applied over only part of the said inner layer, so as to permit direct contact between the said inner layer and outer layer in certain zones, whereby to ensure improved cohesion of the whole. In such an embellisher, which is preferably in the form of a tubular hollow body having a flange portion and a base formed with an aperture so that the base is open, the coating occupies at least that part of the said inner layer that corresponds to the said open base, while at least part of a zone of the said inner layer corresponding to the said flange portion is in direct contact with the said transparent outer layer, whereby to ensure improved cohesion of the two-layer structure.

In this second group of embodiments of the invention, the metalising operation is preferably carried out on a generally concave face, which presents no particular difficulties by contrast with the procedure that has to be adopted in the prior art arrangements, under which metalisation is performed on the reliefs formed on a generally concave face.

Not only does the invention overcome the disadvantages of the prior art, but it also has further advantages. In particular, the embellisher in accordance with the invention may have inner and outer surfaces which are made perfectly smooth, thus making it less liable to retain dirt.

In accordance with a modification within the scope of the invention, the embellisher and the glass form a monobloc unit which may be fitted over the front face of a lighting unit or the like.

Further features and advantages of the invention will appear from the following description, which is given by way of example only and with reference to the accompanying drawings.

DESCRIPTION OF PREFERRED EMBODIMENTS OF THE INVENTION

Figure 1:
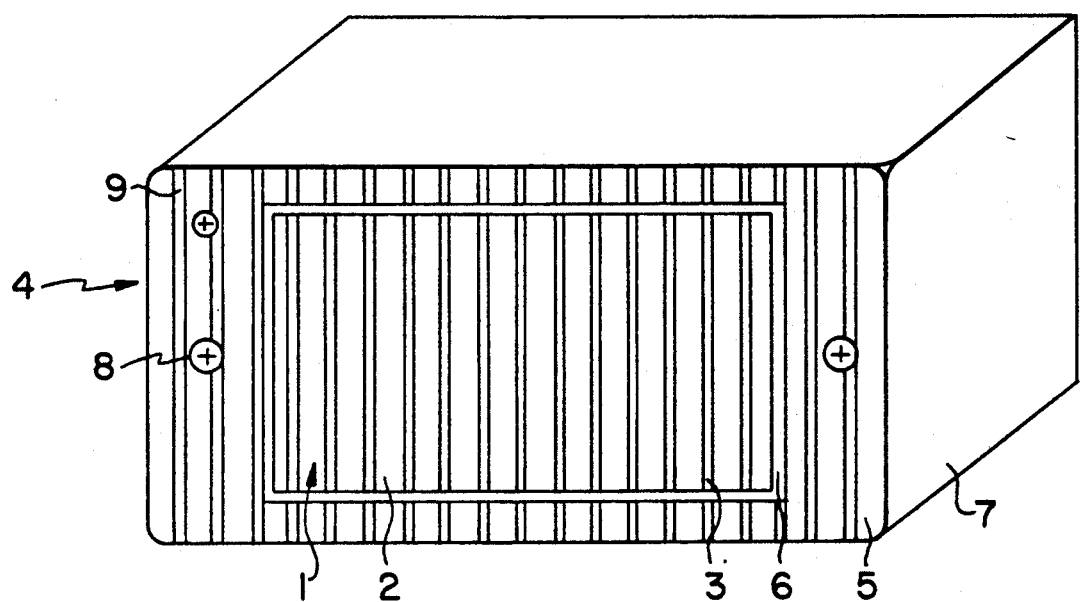
FIG. 1 is a perspective view of an auxiliary driving lamp equipped with an embellisher of a kind known in the prior art.

In FIG. 1, the reference numeral 1 designates a fog lamp or a long range driving lamp for an automotive vehicle. The lamp 1 includes a front glass or lens 2 which is sealingly mounted on a reflector that is not visible in FIG. 1. The reflector is in the form of a hollow body, made from metal or in a plastics material, having a concave surface which is overlaid with a reflective covering, the latter in practice being a thin layer of aluminium. A light source, not shown, is mounted inside the reflector.

In order to ensure a correct configuration for the light beam emitted by the lamp 1, the glass or lens 2 has ribs 3. The outer face of the lens 2 is smooth, the ribs 3 being formed on its inner face which is directed towards the body of the reflector.

As can be seen from FIG. 1, the general shape of the lamp is rectangular, and it is surrounded, at least partially, by an embellisher 4.

The general shape of the embellisher 4 is concave, with a cross section corresponding to the generally rectangular cross section of the lamp 1, for example as shown in FIG. 1. The embellisher has a base 5 in which an aperture or window 6 is formed. The dimensions of the window 6 are so chosen that the window 6 surrounds the lens 2 with a close fit. The embellisher also has a rearwardly extending flange portion 7, so that it has the form of a hollow body. It is provided with means for cooperating with the lamp 1, and for fastening to a vehicle body in such a way that the lens 2 then lies flush in the window 6. Fastening means 8 are provided for securing the unit comprising the lamp 1 and embellisher 4 on to the bodywork of an automotive vehicle, for example in a housing provided for this purpose. The embellisher 4 thus enables a lamp of a given size to be adapted for a housing of any size whatever, provided the housing is larger than the lens of the lamp.

Figure 2:
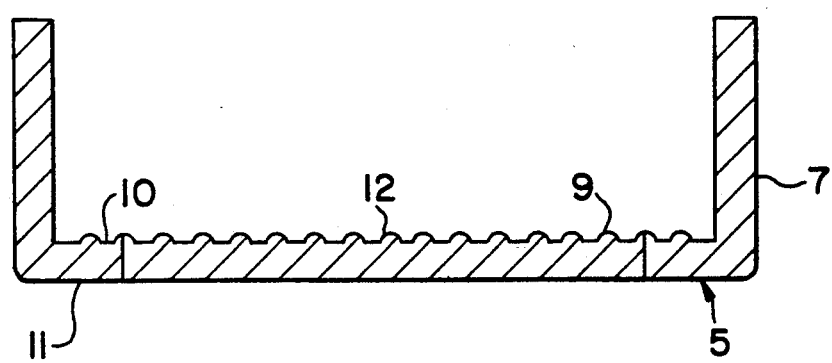
FIG. 2 is a view in cross section of an embellisher of the prior art.

In order to give unity of styling as between the embellisher 4 and the lamp 1, which means in effect between the embellisher 4 and the lens 2, it has already been proposed to form reliefs 9 in the form of ribs on the base 5 of the embellisher as shown in FIGS. 1 and 2, and also on the flange portion 7. So as to avoid the reliefs 9 becoming clogged with dirt, the latter are formed on the inner face 10 of the embellisher, which lies within the volume defined by the embellisher itself, so that the embellisher has a smooth outer face 11.

The embellisher 4 is made of a transparent plastics material, and a layer 12 of aluminium is deposited on the inner face 10, and therefore on the reliefs 9. A protective coating covers the aluminium layer 12.

Unfortunately, the manufacture of an embellisher 4 of the prior art, such as is described above, poses manufacturing problems. In particular, the deposition of an aluminium layer 12 on the reliefs 9 is a particularly delicate operation if this layer is to be uniformly applied, because the reliefs 9 lie inside a concave space.

Reference is now made to FIGS. 3 to 7 which illustrate embodiments of the invention, and which more particularly show an embellisher which has the same generally concave shape as the embellisher 4 in FIG. 1, the embellisher 4 having a structure with two layers.

Figure 3:
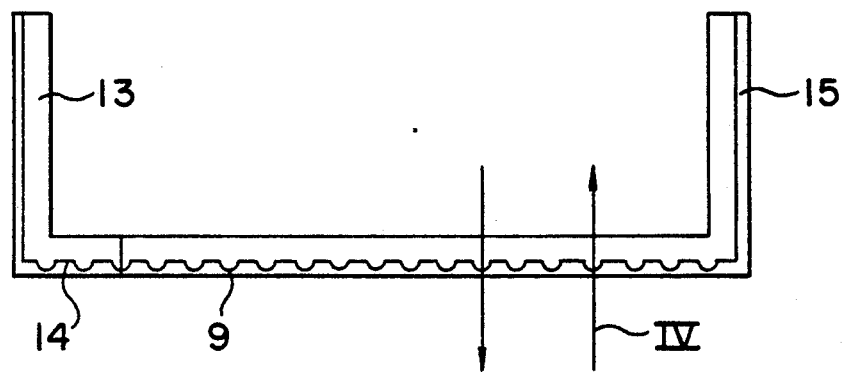
FIG. 3 is a view in cross section of an embellisher in a first embodiment of the invention.
Figure 4:
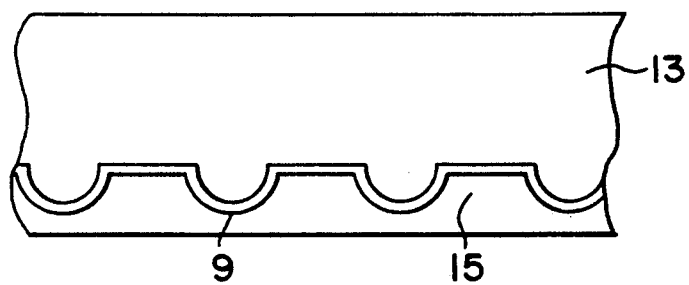
FIG. 4 is a view on a larger scale, showing a detail corresponding to the portion of FIG. 3 marked IV.

In the first embodiment, shown in FIGS. 3 and 4, a first layer 13 (the inner layer) is formed in self-coloured opaque plastics material so as to give the impression of metalising. The reliefs 9 are formed on the convex face 14 (the contoured face) of the inner layer 13. The convex face 14 of the inner layer 13 is overlaid with a transparent second layer 15 (the outer layer). As is best seen in FIG. 4, the thickness of the outer layer 15 is substantially less than that of the inner layer 13. The embellisher shown in FIGS. 3 and 4 is preferably made by two-colour injection, or by two-material injection moulding.

Figure 5:
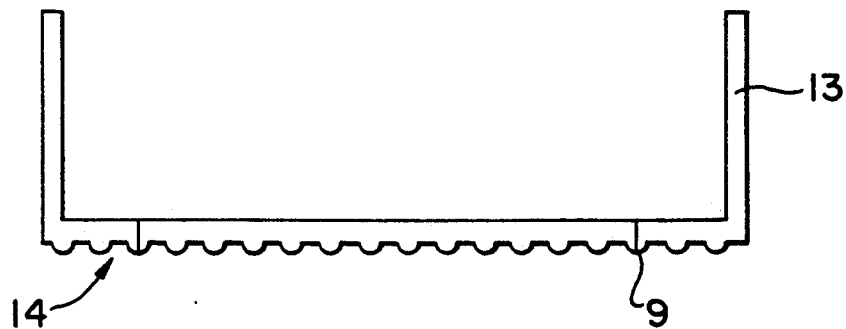
FIGS. 5 to 7 are views in cross section showing the steps in the manufacture of an embellisher, in a second embodiment of the invention.
Figure 6:
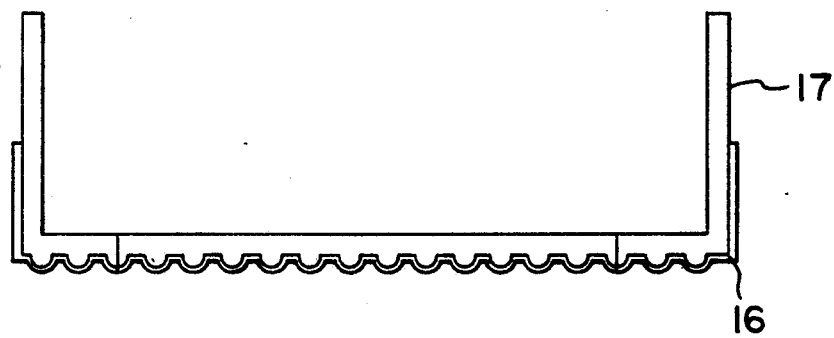
Figure 7:
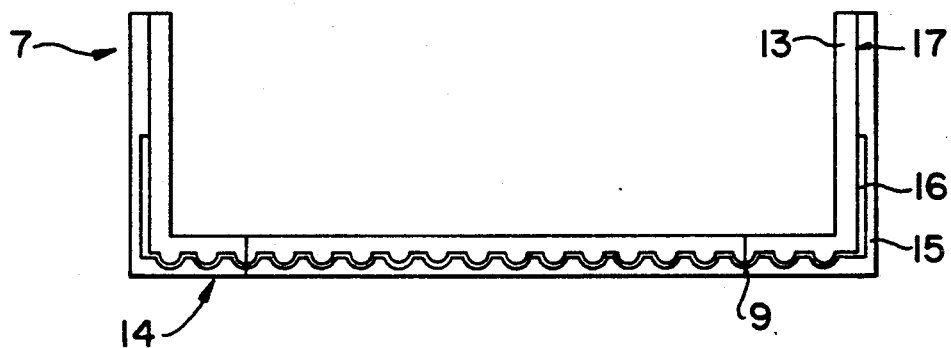

Referring now to FIGS. 5 to 7 which show another embodiment, the embellisher shown in these Figures has a twin layer structure which is largely similar to that of the embellisher shown in FIGS. 3 and 4. The essential difference lies in the application of a layer 16, over the reliefs 9 formed on the convex face 14 of the inner layer 13. The layer 16 is of fine reflective material or has a shiny surface. An outer layer 15 is moulded on to the inner layer, over the convex or contoured face 14 of the latter and over the reflective layer 16.

Preferably, the reflective layer 16 is applied over only part of the surface of the inner layer 13, so as to define at least one uncoated zone 17, not covered by the layer 16, for direct contact between the inner layer 13 and the outer layer 15. This enables better cohesion between the two layers to be obtained.

In practice, the zone 17 corresponds to a portion of the embellisher that is hidden once the embellisher has been installed on the vehicle, and it comprises the part of the layer 13 that lies in the rear part of the flange portion 7 of the embellisher.

The outer layer 15 is made of transparent material, and the inner layer 13 may also be (though it is not necessarily) of a transparent material. The latter can equally be made of a coloured material as in the previous example. In any case, however, the materials for the inner layer 13 and the outer layer 15 are selected in both embodiments in such a way as to be compatible with each other for good cohesion of the embellisher.

The embellisher in the embodiment shown in FIGS. 5 to 7 is made in the following way. The inner layer 13 is first moulded to the shape required for the embellisher, with reliefs 9 on a convex face 14, or contoured face, of the latter. The workpiece thus obtained (see FIG. 5) is placed in a vacuum metalising chamber, masks being provided to prevent the metalising material from reaching a zone 17 which corresponds to the flange portion 7 of the embellisher 1. The metalised workpiece which is thus obtained is shown in FIG. 6. The metalising of the reliefs 9 presents no difficulty, because the latter are formed on a convex face 14.

An outer layer 15 of transparent plastics material is subsequently moulded on to the metalised workpiece shown in FIG. 6, on the side of the latter corresponding to the convex face 14, thus forming the embellisher. Due to the presence of the unmetalised zone 17, the outer layer 15 is very firmly bonded on to the inner layer 13, with very good adhesion and coherence.

In both the embodiments described above, the embellisher preferably has smooth inner and outer faces, with the reliefs 9 being formed within the material itself.

Reliefs 9 are shown as being only on one face, in the base 5 of the embellisher 1. However, it is also possible to provide the reliefs, optionally with different geometry, on a zone lying in the flange portion 7 of the embellisher.

In a further embodiment, which is not shown, but which is within the scope of the invention, the embellisher 4 and the lamp 1 are made as a single unit, the embellisher 4 itself being made as described in any one of the examples given above. In that case, the lamp 1 and line 2 is made of a plastic material and is moulded on to the embellisher 4; alternatively, it may be formed during one of the moulding phases of the embellisher itself. The line 2 may alternatively be actually vitreous, i.e. made of glass, in which case the embellisher 4 is moulded on to the line 2.

The lamp 1 and embellisher 4 is then secured to the vehicle body as a single unit.

What is claimed is:

1. An embellisher in the form of a tubular hollow body with an opening for surrounding an automobile lamp lens having a rib-like visual effect, comprising at least two layers including an outer first transparent layer, with a smooth outer surface and an inner second layer being contoured with rib-like reliefs at an outer surface and having a smooth inner surface, wherein said embellisher rib-like reliefs provide a visual effect which continues that of the rib-like visual effect of the lamp lens.

2. An embellisher according to claim 1, wherein said inner layer is of self-coloured material, and the said outer layer is moulded on to the outer surface of the inner layer.

3. An embellisher according to Claim 1, wherein the inner layer further comprises a reflective coating applied over a surface of the said rib-like reliefs, with the said transparent outer layer being moulded on to the said coated surface.

4. An embellisher according to Claim 3, wherein the said coating is applied over only a portion of the said inner layer, so as to define at least one uncoated zone thereof, the said inner layer being in direct contact with the outer layer in the said uncoated zone.

5. An embellisher according to claim 1 or 2 or 3 or 4, in combination with a lamp.

6. An embellisher for surrounding an automobile lamp lens comprising a first and a second layer, said first layer being a transparent outer layer, said second layer being an inner layer having rib-like reliefs at its outer surface, further including a reflective coating applied over a portion of said inner layer so as to define at least an uncoated zone, the said inner layer being in direct contact with the outer layer in the said uncoated zone, said outer layer being molded onto the said coated portion, said embellisher forming a tubular hollow body having a flange portion and a base, with an aperture formed in the base whereby the base is open, said coating covering that part of the said inner layer which is part of the said open base and with said uncoated zone of the inner layer being in said flange portion.

* * * * *